(12) United States Patent
Broad et al.

(10) Patent No.: US 9,702,960 B2
(45) Date of Patent: Jul. 11, 2017

(54) FREQUENCY DIFFERENCE OF ARRIVAL (FDOA) FOR GEOLOCATION

(71) Applicant: RAYTHEON COMPANY, Waltham, MA (US)

(72) Inventors: John T. Broad, Santa Barbara, CA (US); Lee M. Savage, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 934 days.

(21) Appl. No.: 13/946,217

(22) Filed: Jul. 19, 2013

(65) Prior Publication Data
US 2014/0278214 A1    Sep. 18, 2014

Related U.S. Application Data

(60) Provisional application No. 61/793,291, filed on Mar. 15, 2013.

(51) Int. Cl.
*G01S 3/50*    (2006.01)
*G01S 5/06*    (2006.01)
(Continued)

(52) U.S. Cl.
CPC ...... *G01S 3/50* (2013.01); *G01S 5/06* (2013.01); *G01S 5/12* (2013.01); *G01S 3/46* (2013.01); *G01S 7/021* (2013.01)

(58) Field of Classification Search
CPC . G01S 5/06; G01S 1/04; G01S 5/0221; G01S 3/46; G01S 3/50; G01S 5/12
See application file for complete search history.

(56) References Cited

U.S. PATENT DOCUMENTS 6,670,920 B1    12/2003    Herrick
6,727,851 B2    4/2004    Bass et al.
(Continued)

OTHER PUBLICATIONS

Musicki, D. et al., "Geolocation using TDOA and FDOA measurements," 11th International Conference on Information Fusion, 2008. pp. 1987-1994.
(Continued)

*Primary Examiner* — Gregory J Toatley
*Assistant Examiner* — Kyle R Quigley
(74) *Attorney, Agent, or Firm* — Burns & Levinson LLP; Joseph M. Maraia

(57) ABSTRACT

A method for determining a FDOA of a pulsed waveform received by two sensors includes obtaining a respective plurality of in-phase and quadrature-phase (IQ) samples indicative of a pulse envelope of the received pulsed waveform. The method includes determining a TDOA responsive to a leading edge of a pulse of the pulsed waveform and obtaining a first cross correlation of IQ samples at a delay ($d_c$) closest to the TDOA, and respective second and third cross correlations at least one additional delay ($d_c+1$ and $d_c-1$) on either side of the closest delay. The method includes refining the approximation of the TDOA according to an interpolation of amplitudes of the cross-correlation and determining a respective rate of change of cross-correlation phase ($\Delta\phi$). The method includes approximating a straight line fit to the rates of change of cross-correlation phase ($d\Delta\phi/dt$), the slope of the straight line representative of the FDOA.

13 Claims, 12 Drawing Sheets

(51) Int. Cl.
*G01S 5/12* (2006.01)
*G01S 3/46* (2006.01)
*G01S 7/02* (2006.01)

(56) References Cited

U.S. PATENT DOCUMENTS

| | | | |
|---|---|---|---|
| 7,467,177 B2* | 12/2008 | Simkins | G06F 7/49963 708/551 |
| 2002/0070889 A1* | 6/2002 | Griffin | G01S 1/045 342/353 |
| 2003/0048430 A1* | 3/2003 | Morcom | G01S 17/32 356/5.01 |
| 2007/0120738 A1* | 5/2007 | Stroud | G01S 5/06 342/387 |
| 2011/0074631 A1* | 3/2011 | Parker | G01S 5/16 342/378 |

OTHER PUBLICATIONS

Lyons, R., "Quadrature Signals: Complex, But Not Complicated", Nov. 2008.
Chestnut, Paul C., "Emitter Location Accuracy Using TDOA and Differential Doppler", IEEE Transactions on Aerospace and Electronic Systems, IEEE Service Center, Piscataway, NJ, US, vol. AES-18, No. 2, Mar. 1, 1982, pp. 214-218.

\* cited by examiner

FREQUENCY DIFFERENCE OF ARRIVAL (FDOA) FOR GEOLOCATION

RELATED APPLICATION

This application claims the benefit of U.S. Provisional Application No. 61/793,291, filed Mar. 15, 2013. The entire teaching of the above application are incorporated herein by reference.

GOVERNMENT SUPPORT

This disclosure was supported, in whole or in part, by Contract No. N68936-05-D-0033 awarded by the Naval Air Warfare Center Weapons Division. The Government may have certain rights in the disclosure.

BACKGROUND

A location of a radio emitter can be determined by measuring a frequency difference of arrival (FDOA) of a radar pulse received by two radar pulse receivers separated by a fixed distance. FDOA is the difference in received frequency of the radar pulse between the two radar pulse receivers. The location of the radio emitter can also be determined by measuring a time difference of arrival (TDOA) of the radar pulse received by two radar pulse receivers. A TDOA method calculates the location using the difference in time of arrival of the radar pulse between the two radar pulse receivers. The radar pulse receivers can be on a moving platform such as an aircraft.

SUMMARY

Embodiments of the present disclosure include methods and systems for determining a frequency difference of arrival (FDOA) with respect to a pulsed waveform received from a remote source by two spaced apart sensors located on a moveable platform. One embodiment is a method that includes obtaining for each sensor, a respective plurality of in-phase and quadrature-phase (IQ) samples indicative of a pulse envelope of the received pulsed waveform. The pulsed waveform includes a plurality of pulses. The method also includes determining an approximation of a time difference of arrival (TDOA) responsive to a leading edge of a common sampled pulse of the pulsed waveform. In addition, the method includes obtaining for each pulse of the plurality of pulses, a first cross correlation of IQ samples at a delay ($d_c$) closest to the approximation of the TDOA, and respective second and third cross correlations at least one additional delay ($d_c+1$ and $d_c-1$) on either side of the closest delay. Also, the method includes refining for each pulse of the plurality of pulses, the approximation of the TDOA according to an interpolation of amplitudes of the cross-correlation. The method also includes determining for each pulse of the plurality of pulses, a respective rate of change of cross-correlation phase ($\Delta\phi$) and approximating a straight line fit to the rates of change of cross-correlation phase ($d\Delta\phi/dt$) determined for the plurality of pulses, the slope of the straight line representative of the FDOA.

The method can include repeating the aforementioned method for a subsequent plurality of pulses.

The method can include approximating the straight line by determining a least mean squared error. Also, the method can include interpolation of amplitudes of the cross-correlation for each pulse by fitting a parabola to amplitudes of the first, second and third cross correlations and identifying a delay ($d_m$) corresponding to an apex of the parabola. The pulsed waveform can be electromagnetic radiation. The moveable platform can be selected from the group consisting of: an aircraft; a ship; a missile; and a spacecraft.

The method can further include receiving navigation information indicative of a velocity and relative bearing of the moveable platform and determining a geolocation of the emitter responsive to the received navigation information and the FDOA.

Obtaining for each sensor, a respective plurality of IQ samples, can include receiving at each sensor the pulsed waveform, down converting the received pulsed waveform and coherently detecting the pulse envelope of the pulsed waveform.

The method can also include determining the delay ($d_c$) closest to the approximation of the TDOA by rounding the determined approximation to the TDOA.

Another embodiment of the present disclosure is a system for determining a frequency difference of arrival (FDOA) with respect to a pulsed waveform emanating from a remote emitter. The system includes at least two spaced apart sensors disposed on a moveable platform, each of the at least two sensors adapted to receive the pulsed waveform from the remote emitter. The system also includes a respective receiver channel in communication with each of the at least two sensors. The respective receiver channel is configured to provide a respective plurality of in-phase and quadrature-phase (IQ) samples indicative of a pulse envelope of the received pulsed waveform. The pulsed waveform includes a plurality of pulses. The system also includes a time difference of arrival (TDOA) detector configured to determine an approximation of a TDOA responsive to IQ samples indicative of a leading edge of a common sampled pulse of the pulsed waveform. The system further includes a cross correlator configured to obtain for each pulse of the plurality of pulses, a first complex cross correlation of IQ samples at a delay ($d_c$) closest to the approximation of the TDOA, and respective second and third complex cross correlations at least one additional delay ($d_c+1$ and $d_c-1$) on either side of the closest delay. In addition, the system includes a phase processing module in communication with the cross correlator, the phase processor configured to determine for each pulse of the plurality of pulses, a respective rate of change of cross-correlation phase ($\Delta\phi$). The system also includes a FDOA processing module in communication with the phase processing module, configured to determine FDOA as a slope of a straight line approximation of the rates of change of cross-correlation phase ($d\Delta\phi/dt$) determined for the plurality of pulses.

The respective receiver channels can be individual channels of a multichannel receiver. The system can also include a buffer adapted for respectively storing at least IQ samples obtained from each of the respective channels for at least some of the plurality of pulses. The moveable platform can be selected from the group consisting of: an aircraft; a ship; a missile; and a spacecraft. The at least two spaced apart sensors can be adapted to detect electromagnetic radiation. The remote emitter can be a radar source.

The system can include a navigation system configured to provide updated estimates of at least velocity and relative bearing of the mobile platform. The system can include a geolocation processing module in communication with the FDOA processing module and the navigation system, the geolocation processing module configured to determine an estimate of a geolocation of the remote emitter.

Another embodiment of the present disclosure includes a system for determining a frequency difference of arrival (FDOA) with respect to a pulsed waveform received from a remote source by two spaced apart sensors located on a moveable platform. The system includes means for obtaining for each sensor, a respective plurality of in-phase and quadrature-phase (IQ) samples indicative of a pulse envelope of the received pulsed waveform. The pulsed waveform includes a plurality of pulses. The system also includes a means for determining an approximation of a time difference of arrival (TDOA) responsive to a leading edge of a common sampled pulse of the pulsed waveform. In addition, the system includes a means for obtaining for each pulse of the plurality of pulses, a first cross correlation of IQ samples at a delay ($d_c$) closest to the approximation of the TDOA, and respective second and third cross correlations at least one additional delay ($d_c+1$ and $d_c-1$) on either side of the closest delay. Also, the system includes a means for refining for each pulse of the plurality of pulses, where the approximation of the TDOA is in accordance with an interpolation of amplitudes of the cross-correlation. Further, the system includes a means for determining for each pulse of the plurality of pulses, a respective rate of change of cross-correlation phase ($\Delta\phi$). Also, the system includes a means for determining a FDOA as a slope of a straight line approximation of the rates of change of cross-correlation phase ($d\Delta\phi/dt$) determined for the plurality of pulses.

The methods and systems for determining a frequency difference of arrival (FDOA) described herein (hereinafter "technology") can provide one or more of the following advantages. One advantage of the technology is that combining waveform cross-correlation in each pulse of a waveform with a least-squares fit of a phase rate over several pulses of the waveform yields a more accurate determination of FDOA. In addition, the technology avoids errors caused by uncertainties in leading-edge timing, interpolation between signal samples, and irregularities in pulse rate.

Other aspects and advantages of the current disclosure will become apparent from the following detailed description, taken in conjunction with the accompanying drawings, illustrating the principles of the disclosure by way of example only.

BRIEF DESCRIPTION OF THE DRAWINGS

The foregoing will be apparent from the following more particular description of example embodiments of the disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the disclosure follows.

Figure 1A:
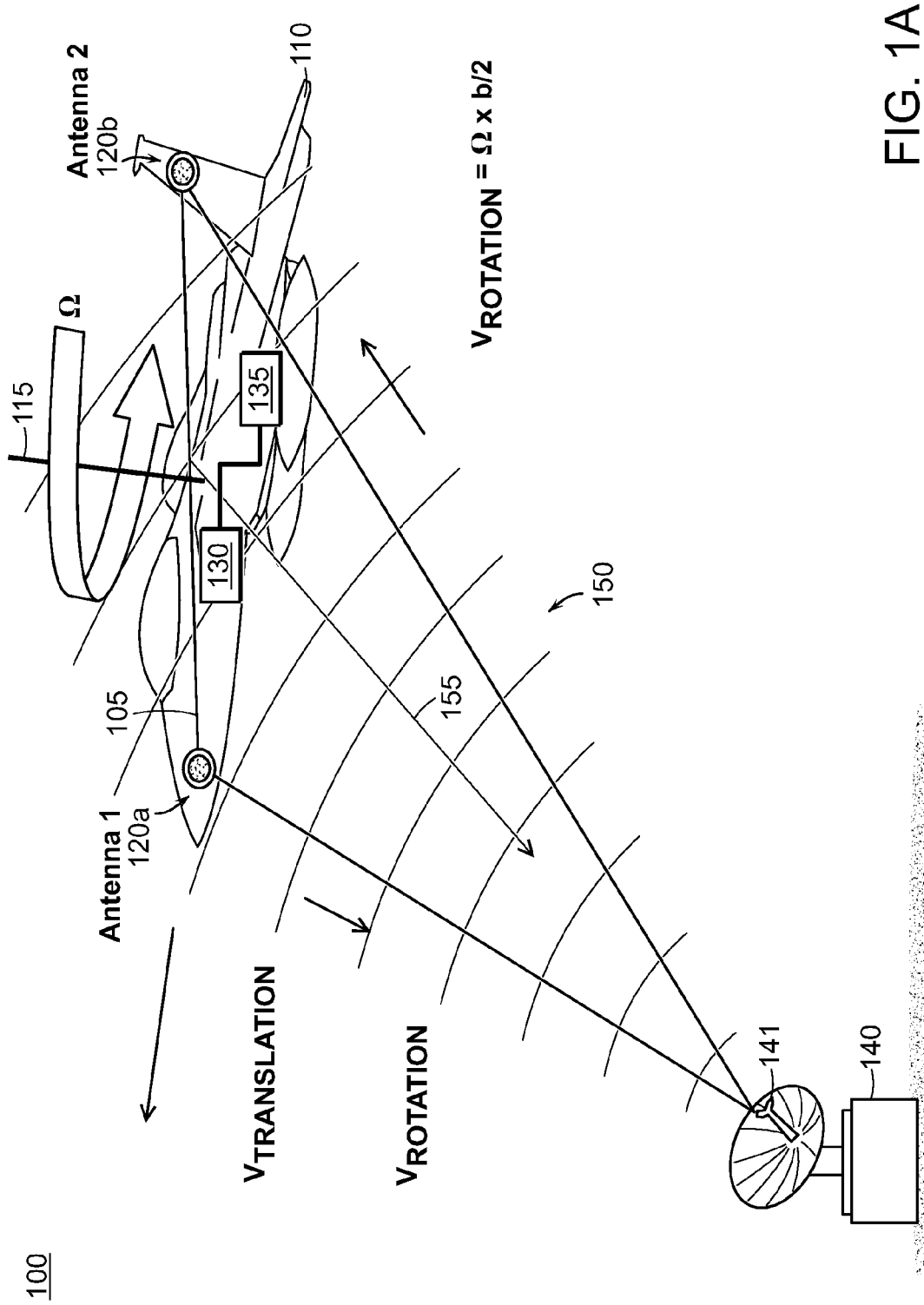
FIG. 1A is a schematic illustration of an environment in which a mobile platform remotely tracks an object via a location detector, in accordance with an example embodiment of the present disclosure.

FIG. 1A is a schematic illustration of an environment 100 in which a mobile platform 110 (e.g., a plane) remotely tracks a fixed object 140 (e.g., a remote emitter) using a location detector 135. In particular, the mobile platform 110 is configured for passive geolocation of the remote emitter 140 based on measured differential Doppler rates resulting from motion of the mobile platform 110 relative to the remote emitter 140.

The remote emitter 140 can be configured to emit electromagnetic radiation 150 predominantly in a preferred direction, for example, by way of a directional device, such as a directional antenna 141. The remote emitter 140 can pulse modulate the electromagnetic radiation 150 to form a pulse waveform. The mobile platform 110 may be illuminated by the electromagnetic radiation 150 periodically, for example, during periods in which the remote emitter scans a volume of space that includes the mobile platform 110. Such instances in which the mobile platform is illuminated by the electromagnetic energy are sometimes referred to as dwells.

In some embodiments, the remote emitter 140 can be sonic, as would be used by a sonar system. In other embodiments, the remote emitter 140 can be a reflector as used by a semi-active radar or ladar system that includes a transmitter. For example, a laser of a ladar system can direct laser energy toward the remote emitter 140. The remote emitter 140 then reflects the energy towards a target. In yet other embodiments, the remote emitter 140 can be a reflector that is illuminated by a radar or ladar transmitter on a different platform, and detected by passive sensors 120a-b. The remote emitter 140 can be, or include, an antenna that transmits RF signals. It should be noted that the remote emitter 140, in some examples, can be a moving object (e.g., an aircraft or other moving remote emitter).

The mobile platform 110 receives (e.g., measures) emissions 150 (e.g., electromagnetic radiation) via the sensors 120a-b (e.g., a first antenna and a second antenna) from the remote emitter 140. As an example, tracking of the remote emitter 140 can be utilized in weapon targeting systems in order to locate and track movement of the remote emitter 140. As another example, tracking of the remote emitter 140 (e.g., rescue beacon, surveillance radar, cell phone, or tracking radar) can be utilized in order to facilitate search and rescue missions that require an accurate indication of the location of the remote emitter 140. In another example, tracking of the remote emitter 140 can be utilized in order to facilitate locating and destroying the remote emitter 140. Although the mobile platform 110 is illustrated as a plane, the mobile platform can be any type of a mobile vehicle (e.g., land-based, air-based, space-based, or sea-based). For instance, the mobile platform can be an aircraft, ship, missile, or spacecraft.

The sensors 120a-b are configured to capture at least a portion of the electromagnetic radiation 150. In an example, the first and second sensors 120a-b are separated by a straight line, referred to as a baseline 105. The mobile platform 110 is configured to perform spatial maneuvers while electromagnetic energy is being received by the sensors 120a-b. In this embodiment, the maneuver includes a rotation about an axis 115. Rotation of the mobile platform 110 about the axis 115 causes a distance between the remote emitter 140 and a first sensor 120a to change. For instance, if the mobile platform 110 rotates about the axis 115 in a clockwise direction (as shown), the first antenna (first sensor) 120a turns away from the remote emitter 140, while the second antenna (second sensor) 120b turns towards the remote emitter 140. In at least some embodiments, such rotational maneuvers can occur while the platform is also moving in a translational sense, with respect to the remote emitter 140 (e.g., from right to left in the figure). Alternatively or in addition, the platform itself can be positioned with a respective pitch, roll and yaw, one or more of which may also vary during a maneuver.

In these embodiments, the sensors 120a-b can be passive sensors that receive radiation but do not transmit radiation. Passive sensing has the advantage of being simple, allowing for clandestine operation, requiring low power, and also can be implemented with only firmware and software changes to existing radar warning receiver equipment or other similar surveillance equipment. It should also be noted that, while two sensors 120a-b are depicted, three or more sensors can be employed.

As stated above, the sensors 120a-b receive emissions 150 (e.g., electromagnetic radiation) from the remote emitter 140. In response to receiving the electromagnetic radiation 150, the mobile platform 110 processes the received emissions 150 to determine a geolocation of the remote emitter 140. In an example, the mobile platform 110 determines the geolocation of the remote emitter 140 by determining a frequency-difference-of arrival (FDOA) of the signals received by the pair of sensors. The mobile platform 110 determines the FDOA by measuring a differential Doppler phase rate between the signals received by the pair of sensors 120a-b. In another example, the mobile platform 110 determines the geolocation of the remote emitter 140 by determining a time difference of arrival (TDOA) between the signals received by the sensors 120a-b. In yet another example, the mobile platform 110 determines both FDOA and TDOA as two measures of the same waveform. For instance, both FDOA and TDOA are determined from the same sample of the signal received by the sensors 120a-b.

Figure 1B:
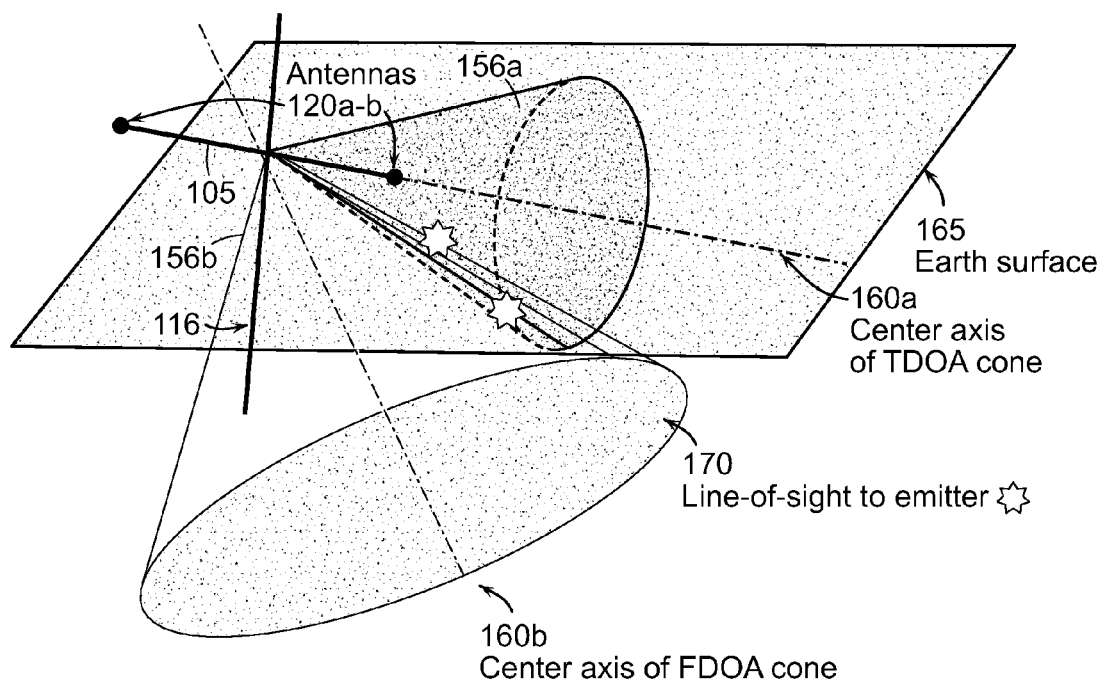
FIG. 1B is a graphical illustration of a time difference arrival (TDOA) cone and frequency difference of arrival (FDOA) cone used to determine a geolocation of a remote emitter, in accordance with an example embodiment of the present disclosure.

As illustrated, the mobile platform 110 includes a motion sensing device (e.g., an inertial navigation system 130) that determines motion (e.g., velocity, position, and acceleration) of the mobile platform 110. Using information corresponding to the motion of the mobile platform and the FDOA/TDOA information determined by the mobile platform 110, the location detector 135 determines a geolocation of the remote emitter 140. FIG. 1B is a graphical illustration of a time difference arrival (TDOA) cone 156a derived from the determined TDOA of a radar signal and frequency difference of arrival (FDOA) cone 156b derived from the determined FDOA of the radar signal 150 used to determine a geolocation of the remote emitter 140, in accordance with an example embodiment of the present disclosure.

A single TDOA measurement places the emitter 140 on the TDOA cone 156a, whose axis is along the baseline 105 connecting the antennas 120a-b. In particular, the TDOA measurements indicate that the emitter 140 is located somewhere on an arc 171 where the TDOA cone 156a intersects the surface of the Earth 165. As the platform 110 flies and maneuvers around axis 116, the TDOA cone 156a and the corresponding arc 171 on the Earth shifts slightly. The location of the emitter 140 can then be determined by a best fit to the series of TDOA measurements.

A similar method can be used to determine a location of the emitter 140 by using an FDOA cone 156b derived from an FDOA measurement. As the platform 110 flies and maneuvers around axis 116, a series of FDOA measurements are used to derive an approximate FDOA cone. The possible geolocation of the emitter 140 lies along the approximate FDOA cone, whose axis 160b is perpendicular to the TDOA cone 156a. The TDOA and FDOA measure two independent quantities. This greatly speeds the convergence of the best fit to an emitter location. The TDOA and FDOA measurement provide an immediate good estimate of the azimuth and elevation to the emitter 140. A series of measurements of TDOA and FDOA can be used for determining the range of the emitter 140 requires.

Referring back to FIG. 1A, for a typical geolocation problem, a remote emitter signal (e.g., signal 150) is received through two antennas (e.g., the sensors 120a-b) separated by a certain baseline 105 distance (e.g., 'b'). As the aircraft rotates through an angle rate about an axis 115 perpendicular to the plane 110 defined by the two antennas and the remote emitter 140, an angular velocity Ω, a vector with magnitude equal to the angular rate of the aircraft 110 about axis 115 and direction of the aircraft 110 along the axis of rotation 115. This rotation causes a velocity of the baseline 105 between port and aft antenna (e.g., sensors 120a-b respectively) to have a rotational velocity of $V_{ROTATION} = \Omega \times b/2$, where b is the baseline vector connecting the antennas and × is the vector cross product. This indicates that the rotational velocity is perpendicular to both the baseline 105 and the axis of rotation 115. As stated above, the moving platform 110 can be rotating around the axis 115. In such an example, the forward fuselage antenna (e.g., sensor 120a) has a velocity that is in the opposite direction (i.e., the velocity has the same value but opposite sign). Thus, the difference in velocity is $2 \cdot V_{ROTATION}$, or $\Omega \times b$.

TDOA ($\Delta T$) can be calculated in accordance with:

$$\Delta T = \frac{1}{c} L \cdot b, \qquad \text{EQN. 1}$$

where L is the line-of-sight vector 155, b is the distance of the baseline 105, and c is the speed of light. FDOA can be calculated as the time derivative of TDOA, as a measure of the different phase rate of change between the two antenna signals that results from Doppler shifts due to the velocities projected in the direction to the emitter. This differential velocity can be decomposed into two components, a rotational component and a translational component. The rotational component stems from the rate of change of the baseline, $db/dt=\Omega \times b$, which is $V_{ROTATION}$ as described above, and is effective at all ranges. The translational component stems from the rate of change of the unit line-of-sight vector, $dL/dt=L \times (v \times L)/r=[v-(L \cdot v)L]/r$, where v is the translational velocity of the platform as a whole, and r is the range to the emitter 140. Because L is defined to have unit length, it can only undergo changes in direction. That forces the direction of change to be perpendicular to L. The range in the denominator makes its contribution less important than the rotational term at long range, but it can be significant at close range. Using a vector identity in accordance with $[L \times (v \times L)] \cdot b = L \cdot [(v \times L) \times b]$, the sum of the rotational and translational terms can be defined in accordance with:

$$\frac{d \Delta T}{dt} = L \cdot \left( \left( \Omega + \frac{v \times L}{r} \right) \times \frac{b}{c} \right). \qquad \text{EQN. 2}$$

In this form, the rate of change of TDOA can be understood as coming from the angular velocity, $\Omega$, of the platform 110 about itself, and the angular velocity, $(v \times L)/r$, of the whole platform 110 in flight around the emitter 140. The FDOA only contains such angular velocities, because L 155 is of constant unit length, and the baseline, b, 105 connecting the antennas is assumed to change only in orientation, not length. It should be noted that the angular velocity, $\Omega$, of a rigid aircraft is the same, no matter what reference point on the aircraft is used to measure the angular velocity.

Figure 2:
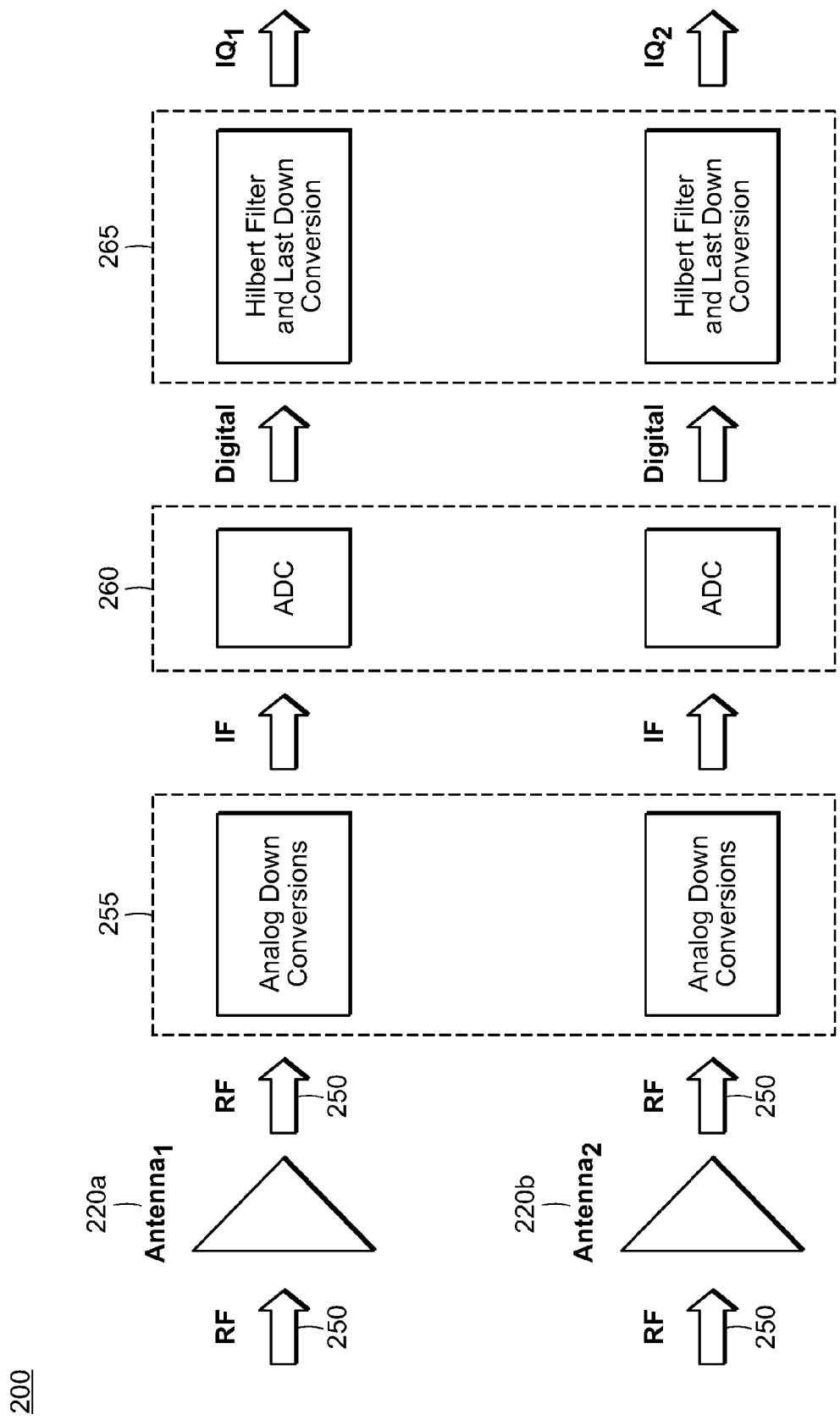
FIG. 2 illustrates a functional block diagram of a system for producing in-phase and quadrature-phase (IQ) samples of a plurality of electromagnetic pulses, in accordance with an example embodiment of the present disclosure.

FIG. 2 illustrates a functional block diagram of a system 200 for producing in-phase and quadrature-phase (IQ) samples of a plurality of pulses (e.g., emissions 150 of FIG. 1A) emitted from a remote emitter (e.g., remote emitter 140 of FIG. 1A). The system includes antennas 220a-b that are configured to intercept at least a portion of the emissions emitted from the remote emitter. The emissions (plurality of pulses), in this example, are radio frequency (RF) energy 250 emissions of a pulse waveform emitted by the remote emitter. The RF energy received at the antennas 220a-b can be defined, for example, in accordance with:

$$A(r,t)=A^0(r,t)\cos(2\pi f(t-r/c)+\phi_0), \qquad \text{EQN. 3}$$

where $A(r,t)$ is the amplitude of the RF pulse, and $A^0(r,t)$ is the pulse envelope, r is the distance of the antenna pair 220a-b from the remote emitter, t is measurement time, f is the frequency of the received RF energy, c is the speed of light, and $\phi_0$ is initial phase of the RF pulse. It should be noted that the RF pulse takes r/c seconds to reach the aircraft, so that 't−r/c' is the time that the RF waveform was emitted. The antennas 220a-b are separated by a straight line, referred to as a baseline. Each of the antennas 220a-b is configured to convert the intercepted RF energy into a corresponding electrical signal. For example, the signal can include time variations in one or more of a voltage and current response to the intercepted RF energy. The antennas 220a-b, via respective output ports, pass the intercepted RF energy to an analog down converter 255. At high frequencies, signal processing circuitry performs poorly. For instance, active devices such as transistors cannot deliver much amplification (gain) at high frequencies. Because RF energy can have very high frequencies, the analog down converter 255 frequency translates the RF energy to a lower frequency, which is referred to as an intermediate frequency (IF) signal, in a signal processing step referred to as down-conversion. The IF signal can also be referred to as a baseband frequency signal "$f_{bb}$" that is defined by the equation $f_{bb}=s(f-f_{LO})$, where $s=+/-1$, f is the frequency of the received RF energy, and $f_{LO}$ is a total local oscillator frequency.

An analog-to-digital converter (ADC) 260 is in communication with an output of the analog down-converter 255. The ADC 260 converts the IF signal to a digital representation of the same signal. A digital output of the ADC 260 is in communication with a filter 265, such as a Hilbert filter, adapted to produce corresponding in-phase I and quadrature phase Q samples of the digital output of the ADC 255. The I component is a real value of a sinusoidal RF signal (e.g., the RF energy) while the Q component is a 90° phase shift of the RF signal. The I component and the Q component can be represented by the notation "IQ." The filter 265 processes the digital representation of the IF signal in accordance with:

$$IQ_m = I_m + iQ_m \approx \frac{A_m^0}{16} \exp[2\pi i(f_{bb}mT_s - sfr/c) - is\phi^0], \qquad \text{EQN. 4}$$

where m is a number samples taken during a sampling period, $T_s$, $I_m$, is the in-phase component and $Q_m$ is the quadrature component of the RF signal received at the $m^{th}$ sampling period in which the RF energy corresponding to the IF signal is intercepted, $i=\sqrt{-1}$, and $A_m^0=A^0(r,mT_s)$, which is the pulse envelope at the time of measurement.

Figure 3A:
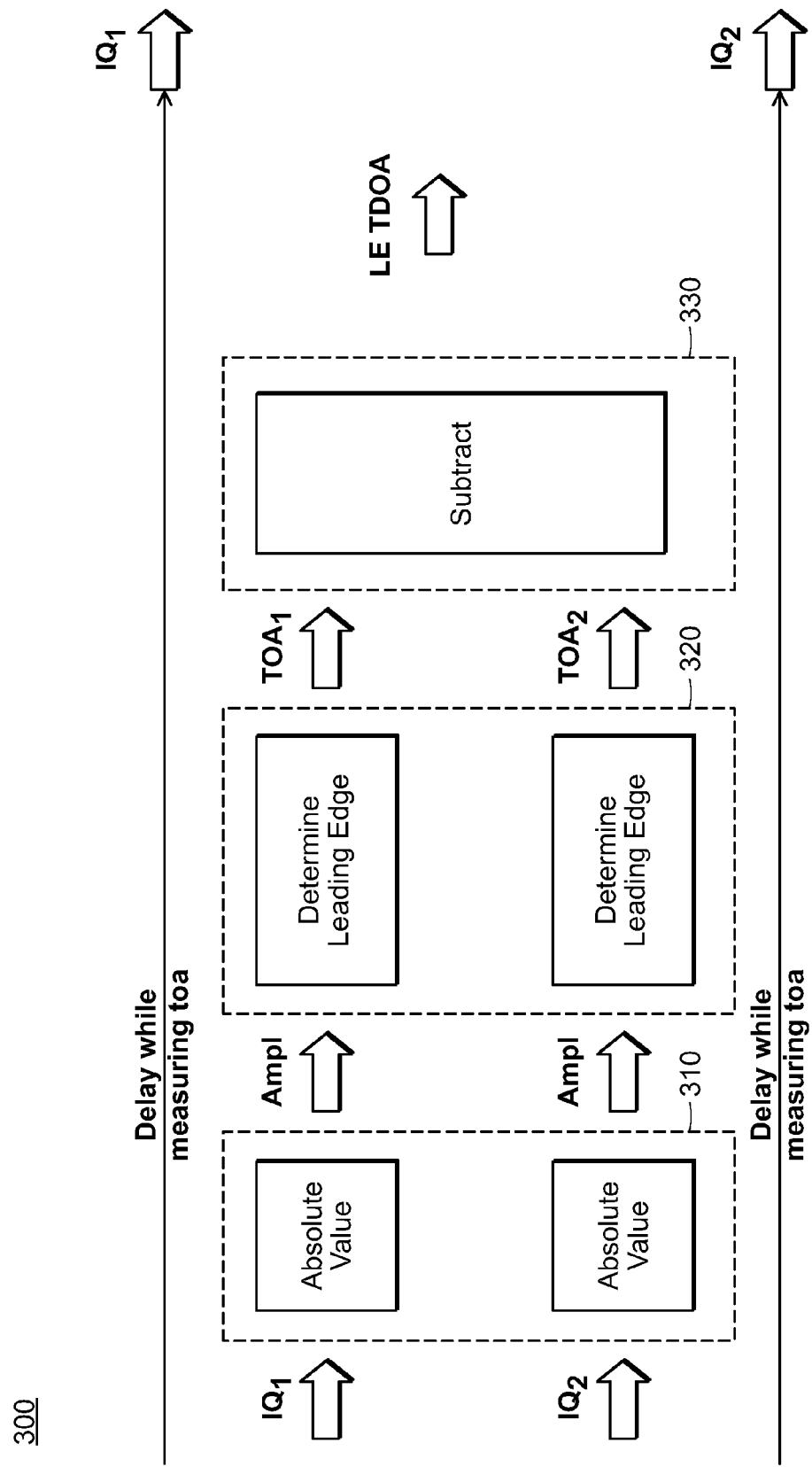
FIG. 3A is a functional block diagram of a system for determining a time difference of arrival (TDOA) of a plurality of pulses emitted from a remote emitter with respect to two antennas, in accordance with an example embodiment of the present disclosure.

FIG. 3A is a functional block diagram of a system 300 for determining a time difference of arrival (TDOA) of a plurality of pulses (e.g., emissions 150 of FIG. 1A) emitted from a remote emitter (e.g., remote emitter 140 of FIG. 1A) with respect to two antennas (e.g., antennas 220a-b of FIG. 2). The system 300 can be communicatively coupled to an output of a Hilbert filter (e.g., filter 265 of FIG. 2). The system 300 includes a pulse envelope detector 310. The pulse envelope detector 310 receives the IQ samples produced by the Hilbert filter. In response to receiving the IQ samples, the pulse envelope detector 310 determines a pulse envelope for each pulse of RF energy received by the antennas. For instance, the pulse envelope detector 310 calculates an absolute value of the IQ samples, $|I_m Q_m|=(I_m^2+Q_m^2)^{1/2}$. In particular, the pulse envelope detector 310 determines the absolute value and phase of IQ by incrementally rotating the complex number $I_m+iQ_m$ down to a real axis with a Cordic algorithm. The absolute value of the IQ samples is the pulse envelope, i.e. the amplitude of the received RF energy.

A time-of-arrival calculator 320 is communicatively coupled to an output (not shown) of the pulse envelope detector 310. The time-of-arrival calculator 320 receives the determined pulse envelope of the IQ samples for each respective antenna. The time-of arrival calculator 320 then determines a leading edge of the pulsed waveform (e.g., the pulsed waveform 305 of FIG. 3B) at each respective antenna to determine the time of arrival of the pulsed waveform at each respective antenna. For instance, the time-of-arrival calculator 320, determines a time, at each antenna, when each respective antenna receives electromagnetic radiation at a predetermined fraction of the determined pulse envelope (amplitude). In some instances, the predetermined fraction is ½ the pulse envelope.

Figure 3B:
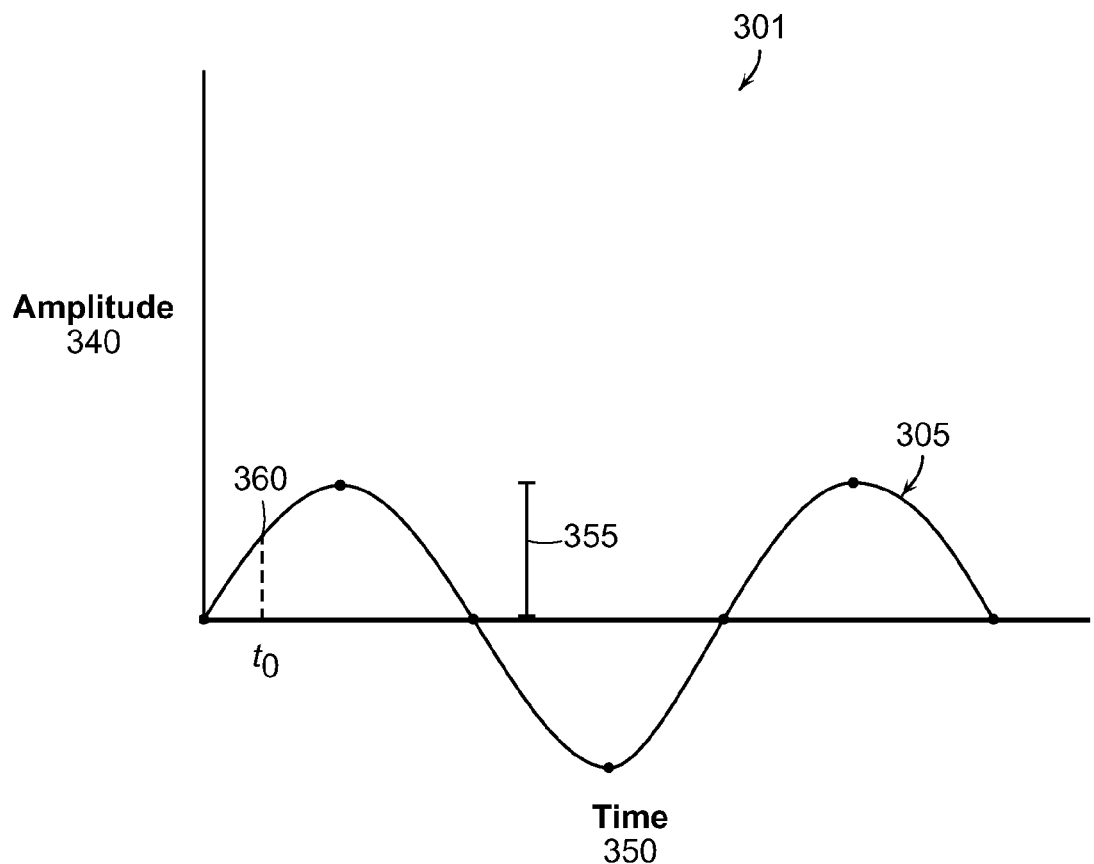
FIG. 3B is a graph of a pulse waveform received at an antenna, in accordance with an example embodiment of the present disclosure.

FIG. 3B illustrates a graph 301 of a pulse waveform 305 received at an antenna. The graph 301 plots the amplitude 340 of the RF energy of the pulse waveform 305 with respect to time 350. As stated above, the time-of-arrival calculator 320, determines a time, at each antenna, when each respective antenna receives electromagnetic radiation (e.g., the pulse waveform 305) at a predetermined fraction (e.g., one-half) of the determined pulse envelope (amplitude 340). Thus, the time-of-arrival calculator 320, determines that each respective antenna first receives the pulse waveform 305 at the first instance each respective antenna detects RF energy at one-half the pulse envelope 355 of the pulse waveform 304. In this example, the first instance is at time $t_0$ 360.

Referring back to FIG. 3A, the time-of-arrival calculator 320 uses the determined time as the time of arrival (TOA) of the RF energy at each respective antenna. A time difference of arrival (TDOA) detector 330 is communicatively coupled to an output (not shown) of the time-of-arrival calculator 320. The TDOA detector 330 receives the TOA information for each antenna and calculates a difference between the TOA of the RF energy at each antenna. The calculated difference is an approximation of the TDOA of the leading edge of a pulse of the pulsed waveform between the antennas.

Figure 4:
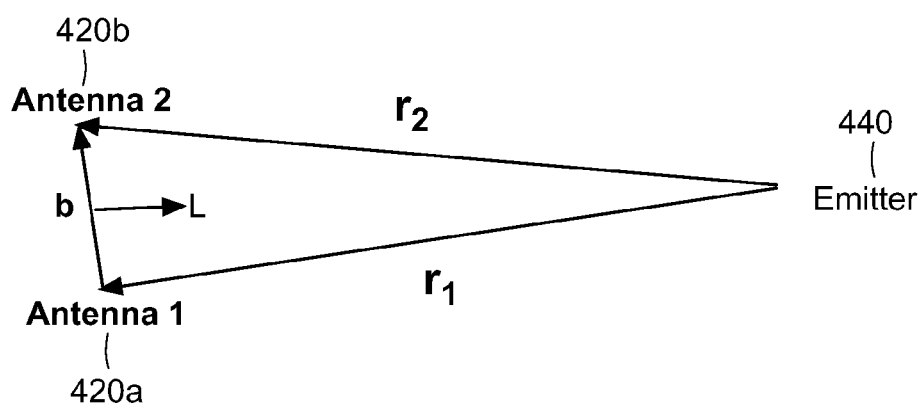
FIG. 4 illustrates an example of a graphical determination of a time difference of arrival (TDOA), in accordance with an example embodiment of the present disclosure.

FIG. 4 illustrates an example of a graphical determination of a time difference of arrival (TDOA). A first position vector r1 is drawn from a remote emitter 440 to a first sensor 420a. Likewise, a second position vector r2 is drawn from the remote emitter 440 to a second sensor 420b. A position vector b is drawn from the first sensor 420a to the second sensor 420b. Vector b corresponds to a baseline for the two sensors 420a-b. In the illustrative example, the second position vector r2 is longer than the first position vector r1. The difference in length is represented by the value r2–r1. Electromagnetic radiation propagating from the emitter 440 reaches each of the sensors 420a-b according to a respective propagation delay determined according to the magnitude of the position vector and the propagation speed of electromagnetic radiation (e.g., approximated by the speed of light in a vacuum, c). A line-of-sight vector (155 of FIG. 1A) vector L can be determined between a median of the baseline b and the emitter. A measured time difference of arrival ΔT between which the pulsed electromagnetic radiation is received at each of the sensors 430a-b can be related to the line of sight according to a dot product of the unit line-of-sight vector L and the sensor baseline vector b, divided by the speed of light in a vacuum in accordance with:

The TDOA determined from the time difference when the leading edge arrives at each antenna, however, is not precise enough for the geolocation of a radio emitter (e.g., the emitter 140 of FIG. 1A). Because the leading edge consists of just a few, often noisy, samples, the measured leading edge can vary considerably from the true value. In order to determine a precise geolocation of the radio emitter, embodiments of the present disclosure uses the values resulting from a cross-correlation of all the IQ samples of in each pulse of the waveform.

Figure 5:
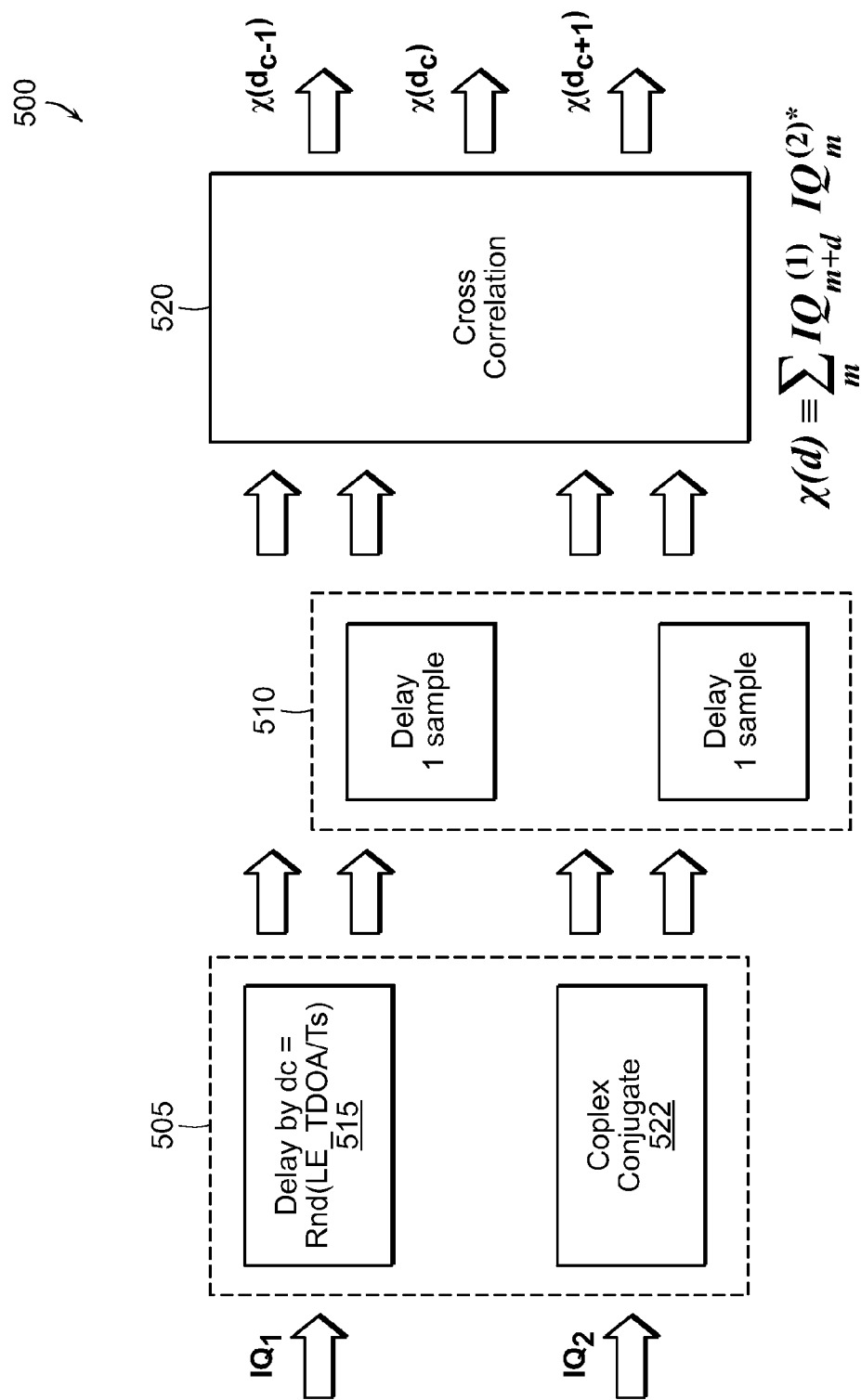
FIG. 5 is a functional block diagram of a system for determining a cross correlation of IQ samples corresponding to a pulsed waveform received at two sensors, in accordance with an example embodiment of the present disclosure.

FIG. 5 is a functional block diagram of a system 500 for determining a cross correlation of IQ samples corresponding to a pulsed waveform (e.g., pulsed waveform 150 of FIG. 1A) received at two sensors (e.g., antennas 120a-b). The system 500 can be communicatively coupled to a time difference of arrival (TDOA) detector (e.g., the TDOA detector 330 of FIG. 3A). A delay identifier 505 obtains a set of delays 510a-b used by a cross correlations processor 520 in order to cross correlate the pulsed waveform received at the two sensors. In particular, the delay identifier 505 uses delay module 515 to determine delays $d_c$, $d_c+1$, and $d_c-1$ as a function of the TDOA (e.g., an approximation of the TDOA of the leading edge (LE_TDOA) of a pulse of the pulsed waveform between the antennas) of the pulsed waveform received at the two sensors. In particular, the delay $d_e$ is $=(LE\_TDOA/T_s)$, rounded to the nearest whole sample estimate of the leading edge TDOA.

In an example, assume that RF energy (e.g., the RF energy 150 of FIG. 1A) arrives at antenna 120a first. We expect the cross-correlation, as computed by the cross-correlation module 520, of the sum of the signal at antenna 120a, $IQ^{(1)}$ and the complex conjugate, as computed by complex conjugate module 522, of the signal at antenna 120b, $IQ^{(2)*}$, to have its maximum value when $IQ^{(1)}$ is delayed to line up exactly $IQ^{(2)}$. The IQ data, however, is only measured at each sample to give the set of $\{IQ_m\}$ in each pulse. For that reason, the delay module 515 delays the signal from antenna 120a by $d_c$ samples to line up to the closest whole sample. In addition, the cross correlation module 520 computes the cross correlation for delaying $IQ^{(1)}$ one more sample to $dc+1$, and $IQ^{(2)*}$ one more sample (which is equivalent to advancing $IQ^{(1)}$ one sample to $dc-1$). With these streams of delayed IQ from each antenna, the cross-correlation sums are computed at the three delays closest to the maximum.

Using the determined delays, delay sampler 510 obtains a sample of the received pulse waveform at each sensor. In particular, the delay sampler 510 obtains a sample of the IQ component of a pulsed waveform received at a first sensor at a sample period. In addition, the delay sampler obtains a sample of the IQ component of the same pulsed waveform received at a second sensor at the sample period plus the delay $d_c$. Also, the delay sampler obtains a sample of the IQ component of the same pulsed waveform received at a second sensor at the sample period plus the delay $d_c-1$. Further, the delay sampler obtains a sample of the IQ component of the same pulsed waveform received at a second sensor at the sample period plus the delay $d_c+1$. The delay sampler 510 passes the set of obtained samples to the cross correlation processor 520.

The cross-correlation processor 520 cross-correlates the set of obtained samples in accordance with:

$$\Delta T = \frac{r_2 - r_1}{c} \approx \frac{L \cdot b}{c} \qquad \text{EQN. 5}$$

$$\chi(d) \equiv \sum_m IQ^{(1)}_{m+d} IQ^{(2)*}_m \propto e^{j\Delta\Phi(d)} \sum_m A^{0(1)}_{m+d} A^{0(2)}_m, \qquad \text{EQN. 6}$$

where, X(d) is the notation for cross-correlation at a delay "d" and m is the number of samples. The $2^{nd}$ form follows from the approximate functional form of IQ given in EQN. 4.

Figure 6A:
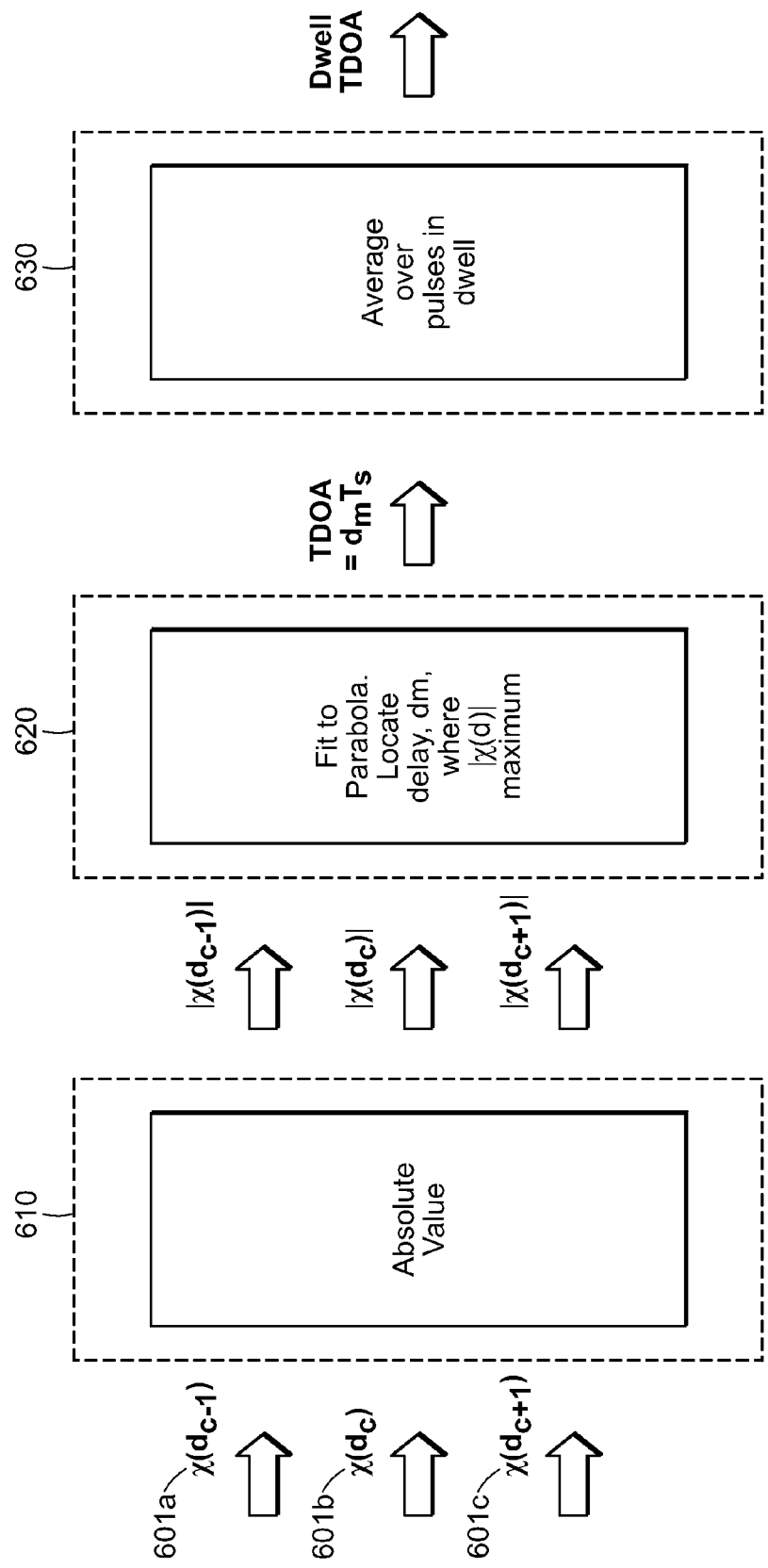
FIG. 6A is a functional block diagram of a system for determining a refined approximation of a time difference of arrival (TDOA) of a pulse of a pulsed waveform received at two sensors, in accordance with an example embodiment of the present disclosure.

FIG. 6A is a functional block diagram of a system 600 for determining a refined approximation of a time difference of arrival (TDOA) of a pulse of a pulsed waveform received at two sensors (e.g., antennas 120a-b). The system 500 can be communicatively coupled to a cross correlations processor (e.g., the cross correlation processor 520). An amplitude processor 610 receives a set of cross-correlated IQ samples at set of delays as described above in reference to FIG. 5. The amplitude processor 620 determines an amplitude of each of cross-correlations at the set of delays 601a-c. For example, the amplitude processor determines the amplitude of the cross-correlation |X(d)| in accordance with:

$$|\chi(d)| \approx \sum_m A_{m+d}^{0(1)} A_m^{0(2)},\qquad \text{EQN. 7}$$

where $A_{m+d}^{0(1)}$, and $A_m^{0(2)}$ are the pulse envelope amplitudes at each sample, m.

Figure 6B:
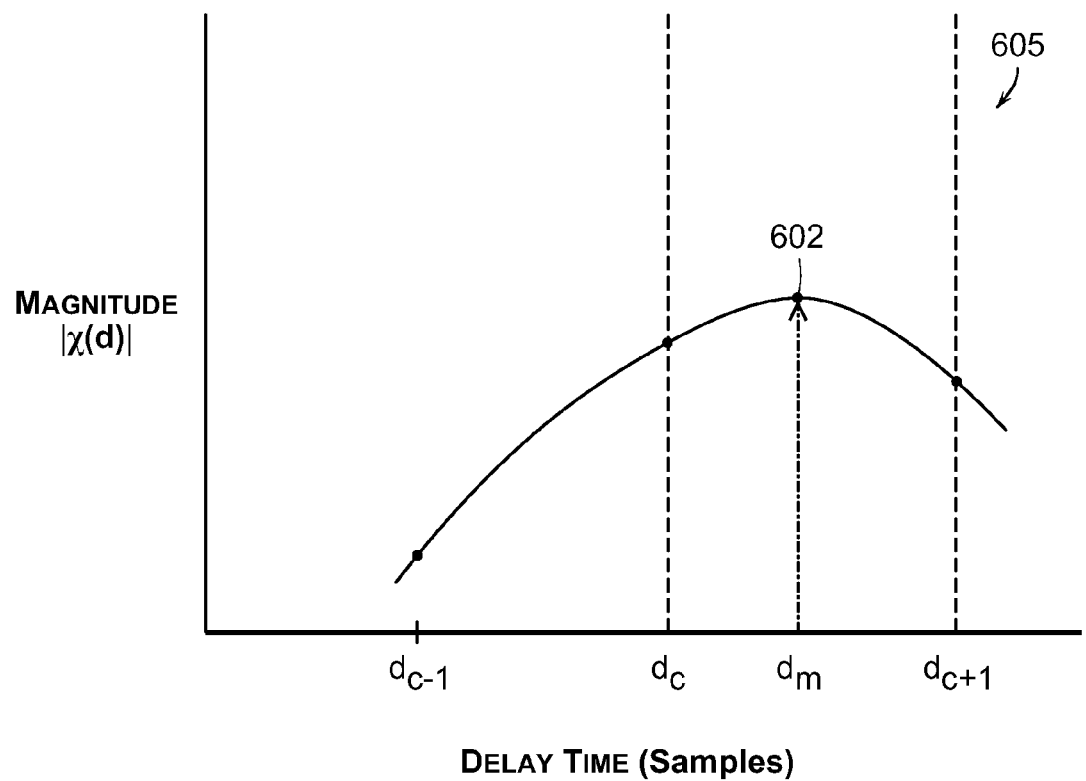
FIG. 6B is a graphical illustration of a parabolic graph that plots the magnitude of the cross-correlations of IQ samples at the delays $d_c$, $d_c+1$, and $d_c-1$ (e.g., $|X(d_c)|$, $|X(d_c-1)|$, and $|X(d_c+1)|$), in accordance with an example embodiment of the present disclosure.

Using the determined amplitudes, a TDOA refinement processor 620 creates a parabolic graph that plots a magnitude of the cross-correlations of IQ samples at the delays $d_c$, $d_c+1$, and $d_c-1$ (e.g., $|X(d_c)|$, $|X(d_c-1)|$, and $|X(d_c+1)|$). FIG. 6B is a graphical illustration of a parabolic graph 605 that plots the magnitude of the cross-correlations of IQ samples at the delays $d_c$, $d_c+1$, and $d_c-1$ (e.g., $|X(d_c)|$, $|X(d_c-1)|$, and $|X(d_c+1)|$). Using the parabolic graph 605, the amplitude processor 620 determines a delay $d_m$ corresponding to a point 602 where the magnitude of the cross-correlations reaches a maximum value. In particular, the amplitude processor in accordance with:

$$d_m = d_c + \frac{[|\chi(d_c+1)| - |\chi(d_c-1)|]/2}{2|\chi(d_c)| - |\chi(d_c+1)| - |\chi(d_c-1)|}\qquad \text{EQN. 8}$$

The TDOA processor 620 then determines a refined TDOA value of the pulse in accordance with:

$$\text{TDOA} = d_m * T_s,\qquad \text{EQN. 9}$$

$d_m$ is the fractional number of samples needed to line up the IQ from the two antennas. Multiplying by the sampling period, $T_s$, then gives the TDOA in units of time. The TDOA processor 620 determines the TDOA using EQN. 9 for each pulse is a dwell. A dwell TDOA processor 630 receives the calculated TDOA for each pulse in the dwell and calculates an average TDOA of the pulses. Although, for geolocation purposes of a remote emitter, the determined average TDOA can be used, the average TDOA is not precise enough. Under typical noisy measurement conditions, the parabolic interpolation (e.g., EQN. 8) used to determine $d_m$ can be precise to 1/10 to 1/5 of the sampling period, $T_s$. In addition, it is difficult to correct for uncertainties in the time delay between arrival of the RF at each antenna and measurement in the receiver. In order to accurately determine the geolocation of the remote emitter, the additional independent value of a frequency difference of arrival (FDOA) of a plurality of pulses (e.g., emissions 150 of FIG. 1A) emitted from a remote emitter (e.g., remote emitter 140 of FIG. 1A) with respect to two antennas (e.g., antennas 120a-b of FIG. 1A) should also be determined in geolocation. The FDOA is determined from the rate of change of the phase difference between the IQ from each antenna.

Figure 7:
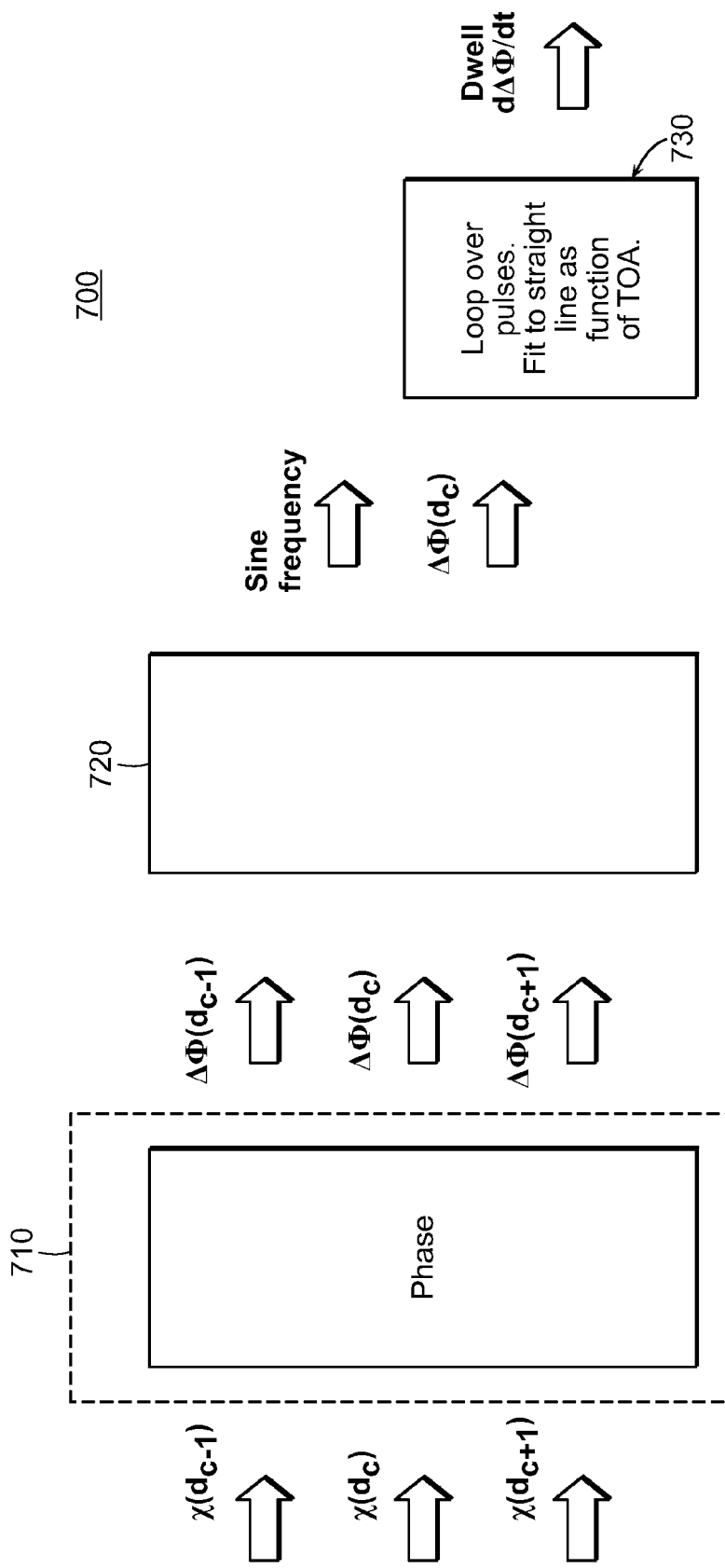
FIG. 7 is a functional block diagram of a system for determining a frequency difference of arrival (FDOA) of a plurality of pulses emitted from a remote emitter with respect to two antennas, in accordance with an example embodiment of the present disclosure.

FIG. 7 is a functional block diagram of a system 700 for determining a frequency difference of arrival (FDOA) of a plurality of pulses (e.g., emissions 150 of FIG. 1A) emitted from a remote emitter (e.g., remote emitter 140 of FIG. 1A) with respect to two antennas (e.g., antennas 120a-b of FIG. 1A). A cross-correlation phase processor 710 receives cross-correlation values X(d) at a set of delays as described above in FIG. 5. The cross-correlation phase processor 710 determines a cross-correlation phase $\Delta\Phi(d_c)$ at a delay $d_c$. The phase processor 710 determines $\Delta\Phi(d_c)$ in accordance with:

$$\Delta\Phi(d_c) \approx 2\pi(f_{bb}d_cT_s - sf\Delta T),\qquad \text{EQN. 10}$$

where $\Delta T$ is the dwell TDOA determined by a dwell TDOA processor (e.g., the dwell TDOA processor 630 of FIG. 6), $s = \pm 1$, is the sign depending on whether the local oscillator frequency used to down convert was greater than or less than the incident RF frequency, f, $f_{bb}$ is the baseband frequency, and $T_s$ is the sampling period. In order to determine an accurate value for $\Delta\Phi(d_c)$, the phase processor 710 determines a refined value of $f_{bb}$ in accordance with:

$$f_{bb} \approx \frac{\Delta\Phi(d_c+1) - \Delta\Phi(d_c-1)}{4\pi T}.\qquad \text{EQN. 11}$$

Once the phase processor 710 determines $\Delta\Phi(d_c)$, the phase processor 710 also determines values for $\Delta\Phi(d_c+1)$ and $\Delta\Phi(d_c-1)$ using EQN. 10.

Occasionally, the leading-edge TDOA estimate for $d_o$ will be off by one sample. This is especially the case, when the TDOA lies nearly half way in between two samples. For a subsequent computation of the FDOA using the phase difference, $\Delta\Phi(d_c)$, for several pulses in a dwell, to the phase processor 710 uses the same value of the delay, $d_o$ for each pulse. Because the phase differences, $\Delta\Phi(d_c+1)$, $\Delta\Phi(d_c)$ and $\Delta\Phi(d_c-1)$ lie on a precise straight line, it is straight-forward to use EQN. 10 and EQN. 11 to compute $\Delta\Phi(d_c)$ at a uniform value of $d_c$.(720).

An first FDOA processor 720 receives the determined cross-correlation phase values and determines a frequency difference of arrival (FDOA) for the pulses represented by the cross-correlation phase values. In particular, the FDOA processor 720 first determines the cross-correlation phase values, $\Delta\Phi(d_c)$, (i.e., standardized phase values) for each pulse in a dwell at the center delay, $d_c$, determined for the first pulse in the dwell.

A second FDOA processor 730 then fits these standardized phase values for each pulse to a straight line as a function of pulse time of arrival (TOA). The slope of that best fit determines the FDOA, $d\Delta T/dt$, from $$\frac{d\Delta\Phi(d_c)}{dt} \approx -2\pi sf \frac{d\Delta T}{dt}.\qquad \text{EQN. 12}$$

Figure 8:
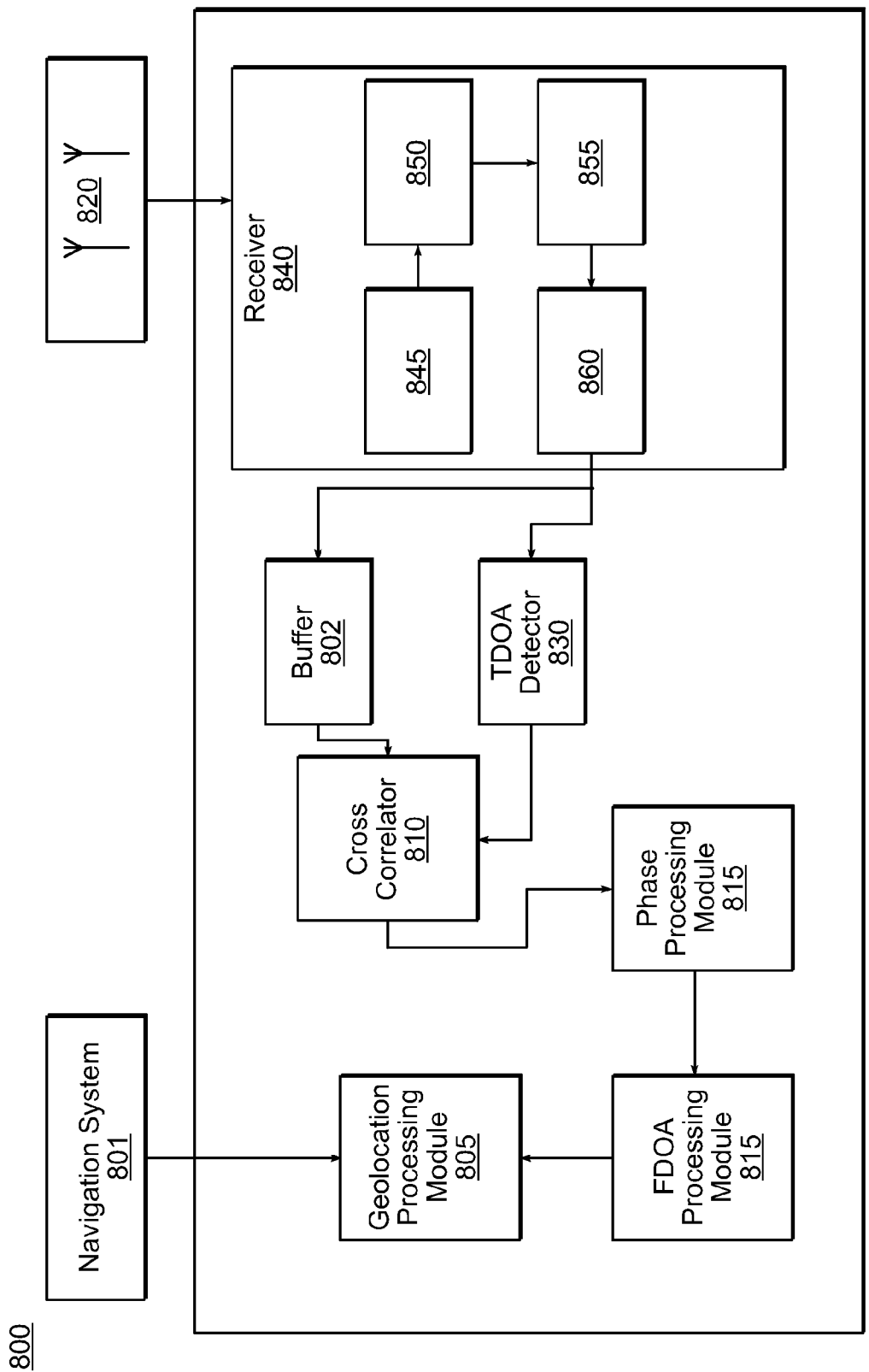
FIG. 8 illustrates a functional block diagram of an embodiment of a passive geolocation system, in accordance with an example embodiment of the present disclosure.

FIG. 8 illustrates a functional block diagram of an embodiment of a passive geolocation system 800. The system includes sensors 820 that are configured to intercept at least a portion of electromagnetic radiation (e.g., emission 150 of FIG. 1A) emitted from a remote emitter (e.g., remote emitter 140 of FIG. 1A) in a dwell. The sensors 820 can be at least two antennas separated by a straight line, referred to as a baseline. Each of the sensors 820 is configured to convert the intercepted electromagnetic radiation into a corresponding electrical signal. For example, the signal can include time variations in one or more of a voltage and current response to the intercepted electromagnetic radiation.

In one example, a receiver 840 includes a low noise amplifier 845 corresponding to each antenna. The low noise amplifier 845 is in electrical communication with an output port of a respective antenna. The low noise amplifier 845 is configured to amplify an electrical signal received from the respective antenna. The receiver 840 also includes an analog down-converter 850. An output of the low noise amplifier 845, representing an amplified version of the received signal is received by the analog down-converter 850 and frequency translated to a lower frequency, which is referred to as an intermediate frequency (IF), in a signal processing step referred to as a down-conversion. An analog-to-digital converter (ADC) 855 is in communication with an output of the analog down-converter 850. The ADC 855 converts the IF signal to a digital representation of the same signal. A digital output of the ADC 855 is in communication with a filter 860, such as a Hilbert filter, adapted to produce corresponding in-phase I and quadrature phase Q samples of the digital output of the ADC 855. The I and Q samples are indicative of a pulse envelope (e.g., amplitude) of the received electromagnetic radiation which in this example is pulse modulated to form pulses of a pulsed waveform. A buffer 802 which is communicatively coupled to an output of the filter 860 stores the I and Q samples.

A time difference of arrival (TDOA) detector 830 is also communicatively coupled to an output of the filter 860. The TDOA detector 830 determines the pulse envelope of the pulsed waveform by calculating an absolute value of the I and Q samples. Using the determined pulse envelope, the TDOA detector 830 calculates a time of arrival (TOA) of the pulse waveform at each of the antennas 820. In particular, the TDOA detector 830 determines a leading edge of the pulsed waveform to determine the time of arrival of the pulsed waveform. For instance, the TDOA detector 830 determines a time, at each antenna, when each respective antenna receives electromagnetic radiation at a predetermined fraction of the determined pulse envelope (amplitude). In some instances, the predetermined fraction is ½ the pulse envelope. The TDOA detector 830 uses the determined time as the TOA of a pulse the pulse waveform at each of the antennas 820. The TDOA detector 830 then calculates a difference between the TOA at each antenna. The calculated difference is an approximation of the TDOA of the leading edge of a pulse of the pulsed waveform between the antennas 820.

The TDOA calculated by the TDOA detector 830 can in some examples be used by a geolocation processing module 805 to determine a geolocation of the remote emitter. However, the TDOA calculated by the TDOA detector 830 is not precise. A cross correlator 810 is communicatively coupled to the TDOA detector 830 and the receiver 840. The cross correlator 810 is configured to obtain, for each pulse of the pulse waveform, a first complex cross correlation of IQ samples at a delay ($d_c$) closest to the approximation of the TDOA calculated by the TDO detector 830. In one example, the delay ($d_c$) is chosen as the closest time sample interval corresponding to the calculated approximation of the TDOA. In addition, the cross correlator 810 obtains, for each pulse of the pulse waveform, respective second and third complex cross correlations at least one additional delay ($d_c+1$ and $d_c-1$) on either side of the closest delay ($d_c$). The cross correlator 810 is further configured to refine, for each pulse of the pulsed waveform, the approximation of the TDOA according to an interpolation of amplitudes of the cross-correlation. For example, the cross correlator 810 fits a parabola to amplitudes of the first, second, and third cross correlations and identifies a delay($d_m$) corresponding to an apex of the parabola.

A phase processing module 815 is communicatively coupled with the cross correlator 810. The phase processing module 815 is configured to determine, for each pulse of the pulsed waveform, a respective rate of change of cross-correlation phase ($\Delta\phi$). A frequency difference of arrival (FDOA) processing module 825 is communicatively coupled with the phase processing module 815. The FDOA processing module 825 is configured to determine FDOA as a slope of a straight line approximation of the rates of change of cross-correlation phase ($d\Delta\phi/dt$) determined for the plurality of pulses. In an example, the FDOA processing module 825 approximates the slope of the straight line by determining a least mean squared error corresponding to the rates of change of cross-correlation phase ($d\Delta\phi/dt$) determined for the plurality of pulses.

A geolocation processing module 805 uses the FDOA received from the FDOA processing module 825 and motion information (e.g., velocity and bearing) of the mobile platform received from a navigation system 801 to determine an estimate of a geolocation of the remote emitter.

Figure 9A:
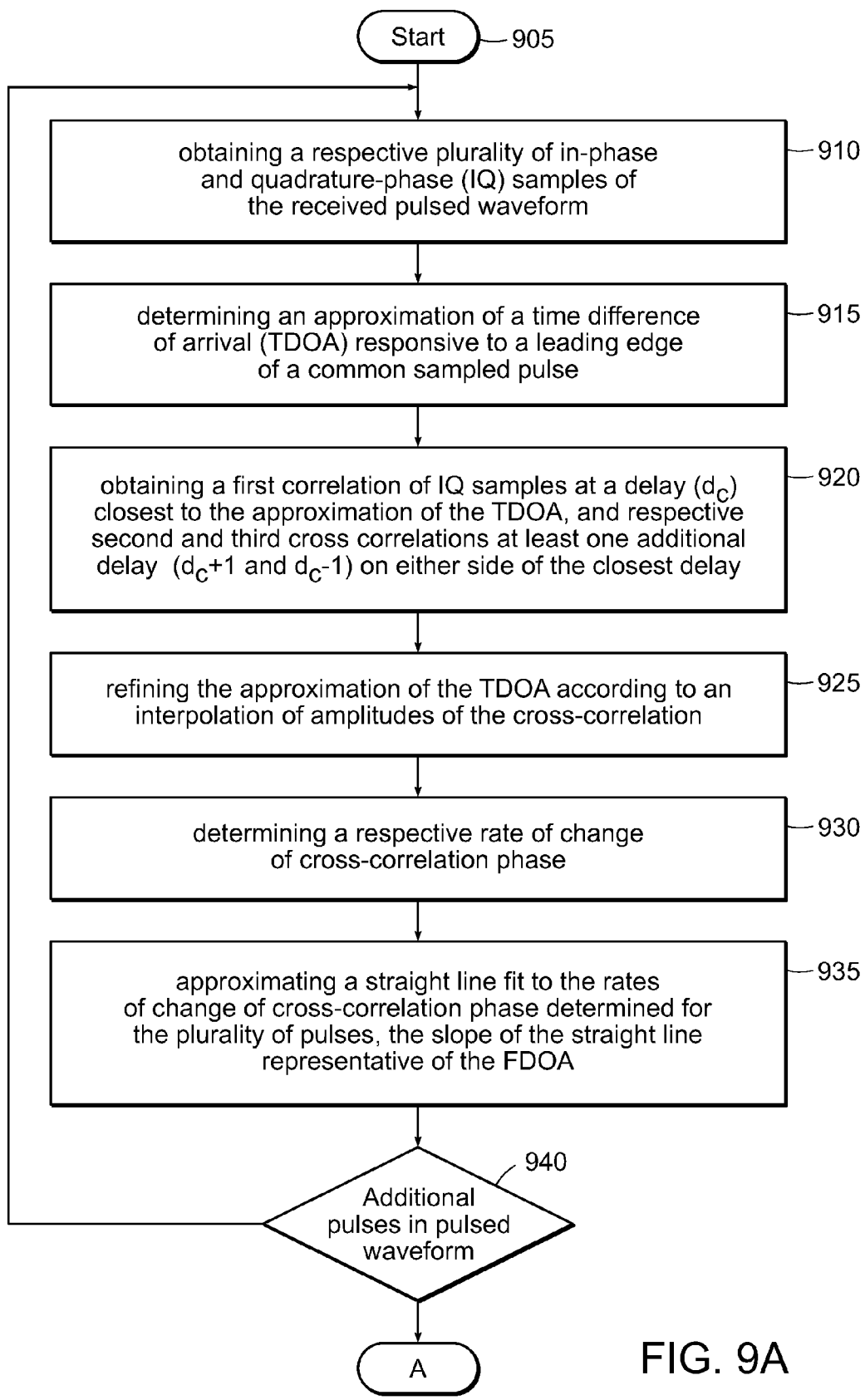
FIGS. 9A-B are flow diagrams of a method for determining a frequency difference of arrival (FDOA), in accordance with an example embodiment of the present disclosure.
Figure 9B:
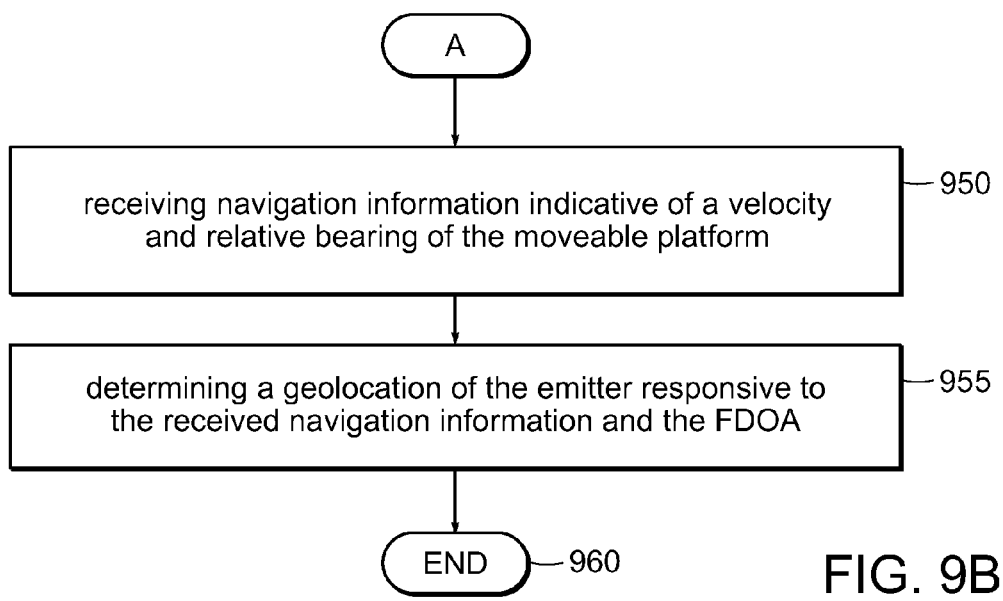

FIGS. 9A-B is a flow diagram of a method 900 for determining a frequency difference of arrival (FDOA) in accordance with an example embodiment of the present disclosure. The method 900 begins at 905. At 910, the method includes obtaining, for each sensor on a mobile platform, a respective plurality of in-phase and quadrature-phase (IQ) samples indicative of a pulse envelope of the received pulsed waveform. For instance, sensors (e.g., sensors 820 of FIG. 8) are configured to receive a pulsed waveform which is down converted by a receiver (e.g., the receiver 840 of FIG. 8). The receiver also coherently detecting the pulse envelope of the pulsed waveform.

The method also includes, at 915, determining an approximation of a time difference of arrival (TDOA) responsive to a leading edge of a common sampled pulse of the pulsed waveform. Approximation of the straight line can include determining a least mean squared error.

At 920, the method includes obtaining, for each pulse of the plurality of pulses, a first cross correlation of IQ samples at a delay ($d_c$) closest to the approximation of the TDOA, and respective second and third cross correlations at least one additional delay ($d_c+1$ and $d_c-1$) on either side of the closest delay. The method, at 925, includes refining for each pulse of the plurality of pulses, the approximation of the TDOA according to an interpolation of amplitudes of the cross-correlation. At 930, the method includes determining for each pulse of the plurality of pulses, a respective rate of change of cross-correlation phase ($\Delta\phi$). Also, at 935, the method includes approximating a straight line fit to the rates of change of cross-correlation phase ($d\Delta\phi/dt$) determined for the plurality of pulses, where the slope of the straight line is representative of the FDOA. At 940, the method includes determining if there are any additional pulses corresponding to the pulsed waveform. If so, the method continues at 910. If not, the method, at 950, includes receiving navigation information indicative of a velocity and relative bearing of the moveable platform. At 955, the method includes determining a geolocation of the emitter responsive to the received navigation information and the FDOA. At 960, the method ends.

Figure 10:
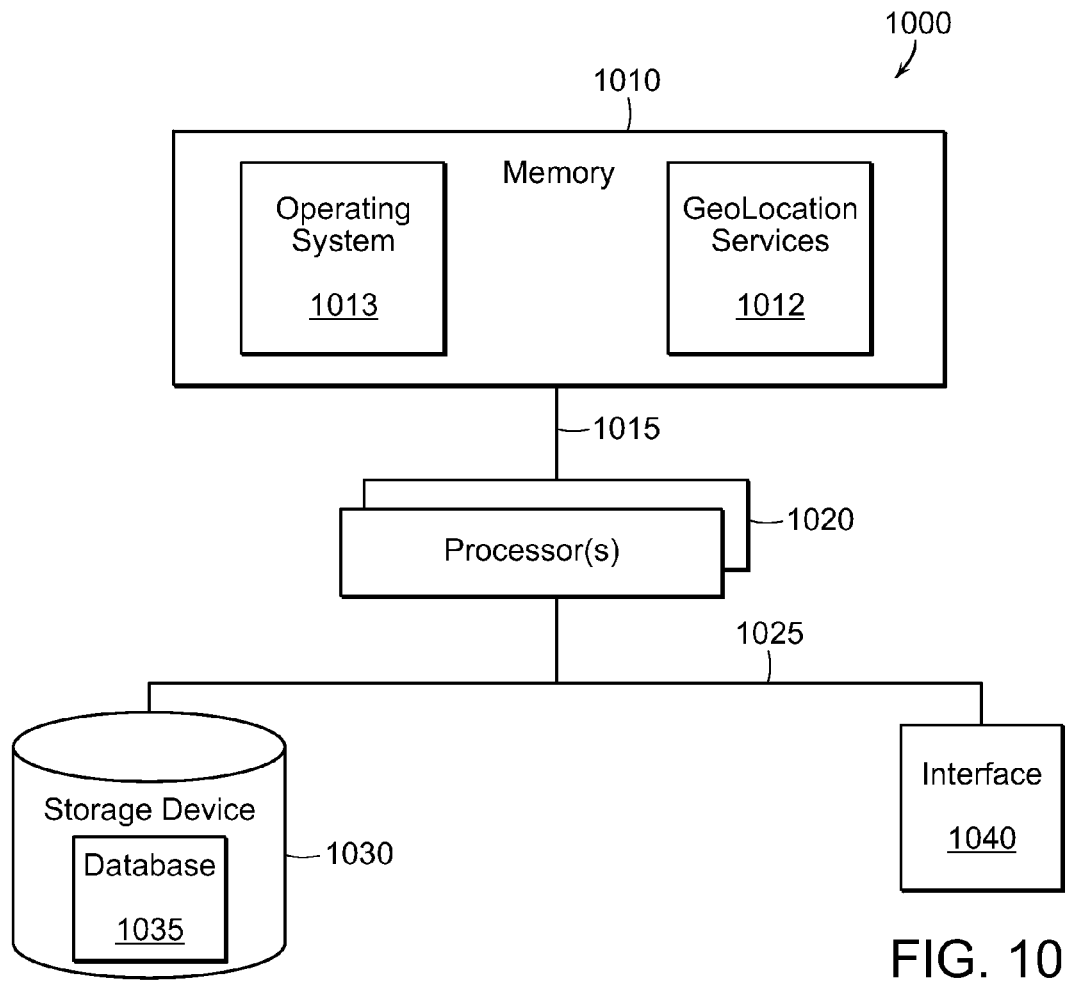
FIG. 10 is a block diagram of a location detector that employs geolocation services, in accordance with an example embodiment of the present disclosure.

FIG. 10 is a block diagram of a location detector 1000 that employs geolocation services 1012 in accordance with an example embodiment of the present disclosure. The location detector 1000 includes a memory 1010 coupled to processor(s) 1020 via a memory bus 1015, and a storage device 1030 and an interface 1040 coupled to the processor 1020 via an input/output (I/O) bus 1025. It should be noted that the location detector 1000 may include other devices, such as keyboards, display units and the like. The interface 1040 interfaces the location detector 1000 to sensors (e.g., sensors 820 of FIG. 8) and enables data (e.g., packets) to be transferred between the location detector 1000 and the sensors. The network interface 1040 may include conventional circuitry that incorporates signal, electrical and mechanical characteristics, and interchange circuits to interface with physical media of the user device and protocols running over that media. The storage device 1030 is a conventional storage device (e.g., a disk) capable of storing, inter alia, sensor signals.

The memory 1010 is an example computer-readable medium, optionally implemented as a RAM employing RAM devices, such as DRAM devices and/or flash memory devices. The memory 1010 contains various software and data structures used by processor(s) 1020, such as software and data structures used by the processor(s) 1020, such as software and data structures that implement aspects of the present disclosure. Specifically, the memory 1010 may store software configured to serve as an operating system 1013 or provide geolocation services 1012. The operating system 1013 can be used to functionally organize the location detector 1000 by invoking operations in support of processes and services executing on the location detector 1000, such as the geolocation services 1012. The geolocation services 1012, as described herein, can include non-transitory computer-executable instructions for comparing decision options.

The storage device 1030 may include a database 1035, which may be implemented in the form of a data structure that is configured to hold various information used for processing sensor signals.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method for determining a frequency difference of arrival (FDOA) with respect to a pulsed waveform comprising a plurality of pulses received from a remote emitter by two spaced apart sensors located on a same moveable platform, the method comprising:

(a) obtaining, by a multichannel receiver, and for each sensor, a respective plurality of a number (m) of in-phase and quadrature-phase (IQ) samples indicative of a pulse envelope of the received pulsed waveform taken over a sampling period $T_s$;

(b) determining, by a time difference of arrival (TDOA) detector, an approximation of a leading edge time difference of arrival (LE_TDOA) responsive to the plurality of (m) IQ samples and as a function of a leading edge of a common sampled pulse of the received pulsed waveform;

(c) obtaining, by a cross correlator, and for each pulse of the plurality of pulses, a first complex cross correlation of IQ samples at a first delay ($d_c$) closest to the approximation of the LE_TDOA, and respective second and third complex cross correlations at a second delay ($d_c+1$) and a third delay ($d_c-1$), respectively, on either side of the first delay ($d_c$), where the first delay ($d_c$)=(LE_TDOA/$T_s$), rounded to the nearest whole sample estimate of LE_TDOA;

(d) refining, by the TDOA detector, for each pulse of the plurality of pulses, the approximation of the LE_TDOA according to an interpolation of amplitudes of the first complex cross-correlation;

(e) determining, by a phase processor, for each pulse of the plurality of pulses, a respective rate of change ($d\Delta\phi/dt$) of a cross-correlation phase ($\Delta\phi$);

(f) approximating, by a frequency difference of arrival (FDOA) processor, a straight line fit to the rates of change of cross-correlation phase ($d\Delta\phi/dt$) determined for the plurality of pulses, wherein a slope of the straight line is the FDOA;

(g) receiving, at a navigation system, navigation information indicative of a velocity and relative bearing of the moveable platform; and (h) determining, by a geolocation processor, a geolocation of the remote emitter as a function of the received navigation information and the determined FDOA.

2. The method of claim 1, wherein approximating the straight line fit comprises determining a least mean squared error.

3. The method of claim 1, wherein the interpolation of amplitudes of the first complex cross-correlation for each pulse comprises:
fitting a parabola to amplitudes of the first, second and third complex cross correlations; and
identifying a delay ($d_m$) corresponding to an apex of the parabola.

4. The method of claim 1, wherein the pulsed waveform comprises electromagnetic radiation.

5. The method of claim 1, wherein the moveable platform is selected from the group consisting of: an aircraft; a ship; a missile; and a spacecraft.

6. The method of claim 1, wherein obtaining for each sensor, a respective plurality of IQ samples comprises:
downconverting, at the multichannel receiver, the received pulsed waveform; and
coherently detecting the pulse envelope of the downconverted pulsed waveform.

7. The method of claim 1, further comprising repeating (a) through (h) for a subsequent plurality of received pulses.

8. A system for determining a frequency difference of arrival (FDOA) with respect to a pulsed waveform comprising a plurality of pulses emanating from a remote emitter, comprising:
at least two spaced apart sensors disposed on a same moveable platform, each of the at least two sensors configured to receive the pulsed waveform from the remote emitter;
a multichannel receiver having a respective receiver channel in communication with each of the at least two sensors, the multichannel receiver configured to provide a respective plurality of a number (m) of in-phase and quadrature-phase (IQ) samples indicative of a pulse envelope of the received pulsed waveform taken over a sampling period $T_s$;
a time difference of arrival (TDOA) detector configured to determine an approximation of a leading edge time difference of arrival (LE_TDOA) responsive to the plurality of m IQ samples and as a function of a leading edge of a common sampled pulse of the received pulsed waveform;
a cross correlator configured to obtain, for each pulse of the plurality of pulses, a first complex cross correlation of IQ samples at a first delay ($d_c$) closest to the approximation of the LE_TDOA, and respective second and third complex cross correlations a second delay ($d_c+1$) and a third delay ($d_c-1$), respectively, on either side of the first delay ($d_c$), where the first delay ($d_c$)=(LE_TDOA/$T_s$), rounded to the nearest whole sample estimate of LE_TDOA;
a phase processing module, in communication with the cross correlator, configured to determine for each pulse of the plurality of pulses, a respective rate of change ($d\Delta\phi/dt$) of a cross-correlation phase ($\Delta\phi$);
an FDOA processing module, in communication with the phase processing module, configured to determine the FDOA as a slope of a straight line approximation of the rates of change of cross-correlation phase ($d\Delta\phi/dt$) determined for the plurality of pulses;
a navigation system configured to provide updated estimates of at least a velocity and a relative bearing of the mobile platform; and
a geolocation processing module, in communication with the FDOA processing module and the navigation system, configured to determine an estimate of a geolocation of the remote emitter.

9. The system of claim 8, further comprising a buffer, in communication with the multichannel receiver, configured to store at least IQ samples obtained from each of the respective channels for at least some of the plurality of pulses.

10. The system of claim 8, wherein the moveable platform is selected from the group consisting of: an aircraft; a ship; a missile; and a spacecraft.

11. The system of claim 8, wherein the at least two spaced apart sensors are adapted to detect electromagnetic radiation.

12. The system of claim 8, wherein the remote emitter is a radar source.

13. A system for determining a frequency difference of arrival (FDOA) with respect to a pulsed waveform comprising a plurality of pulses received from a remote emitter by two spaced apart sensors located on a same moveable platform, comprising:
means for obtaining for each sensor, a respective plurality of a number (m) of in-phase and quadrature-phase (IQ) samples indicative of a pulse envelope of the received pulsed waveform taken over a sampling period $T_s$;
means for determining an approximation of a leading edge time difference of arrival (LE_TDOA) responsive to the plurality of (m) IQ samples and as a function of a leading edge of a common sampled pulse of the pulsed waveform;
means for obtaining for each pulse of the plurality of pulses, a first complex cross correlation of IQ samples at a first delay ($d_c$) closest to the approximation of the LE_TDOA, and respective second and third complex cross correlations at a second delay ($d_c+1$) and a third delay ($d_c-1$), respectively, on either side of the first delay ($d_c$), where the first delay ($d_c$)=(LE_TDOA/$T_s$), rounded to the nearest whole sample estimate of LE_TDOA;
means for refining for each pulse of the plurality of pulses, the approximation of the LE_TDOA according to an interpolation of amplitudes of the first complex cross-correlation;

means for determining for each pulse of the plurality of pulses, a respective rate of change ($d\Delta\phi/dt$) of a cross-correlation phase ($\Delta\phi$);

means for determining a FDOA as a slope of a straight line approximation of the rates of change of cross-correlation phase ($d\Delta\phi/dt$) determined for the plurality of pulses;

means for providing updated navigating estimates of at least a velocity and a relative bearing of the mobile platform; and geolocation processing means, in communication with the FDOA determining means and the navigating means, for determining an estimate of a geolocation of the remote emitter.

* * * * *